United States Patent
Fanucci et al.

(10) Patent No.: US 7,243,879 B2
(45) Date of Patent: Jul. 17, 2007

(54) LATTICE FIN FOR MISSILES OR OTHER FLUID-BORN BODIES AND METHOD FOR PRODUCING SAME

(75) Inventors: Jerome P. Fanucci, Lexington, MA (US); Michael J. King, Topsfield, MA (US); James J. Gorman, Boxborough, MA (US)

(73) Assignee: Kazak Composites, Incorporated, Woburn, MA (US)

( * ) Notice: Subject to any disclaimer, the term of this patent is extended or adjusted under 35 U.S.C. 154(b) by 0 days.

(21) Appl. No.: 10/313,222

(22) Filed: Dec. 6, 2002

(65) Prior Publication Data

US 2003/0173459 A1    Sep. 18, 2003

Related U.S. Application Data

(60) Provisional application No. 60/422,012, filed on Oct. 29, 2002, provisional application No. 60/337,318, filed on Dec. 6, 2001.

(51) Int. Cl.
*B64C 3/26* (2006.01)
(52) U.S. Cl. .................................................. 244/123.1
(58) Field of Classification Search ................ 244/123, 244/3.24, 124, 131, 87, 88; 416/227, 223, 416/236 R, 227 R
See application file for complete search history.

(56) References Cited

U.S. PATENT DOCUMENTS

| | | | | |
|---|---|---|---|---|
| 1,335,527 A | * | 3/1920 | Plym ........................... 224/123 |
| 2,115,504 A | * | 4/1938 | Wallis ......................... 52/726.2 |
| 2,378,885 A | * | 6/1945 | Watter ...................... 244/117 R |
| 2,734,586 A | * | 2/1956 | Wright et al. ................ 416/226 |
| 3,119,333 A | * | 1/1964 | Loughran ................... 244/3.24 |
| 3,135,203 A | * | 6/1964 | Halsted et al. ............. 244/3.24 |
| 4,737,527 A | * | 4/1988 | Maranci ...................... 523/205 |
| 5,048,773 A | | 9/1991 | Washington et al. ....... 244/3.28 |
| 5,429,853 A | * | 7/1995 | Darrieux ...................... 428/102 |
| 5,501,414 A | * | 3/1996 | Bauer .......................... 244/124 |
| 5,897,078 A | * | 4/1999 | Burnham et al. ........ 244/117 R |
| 6,190,484 B1 | * | 2/2001 | Appa .......................... 156/189 |

FOREIGN PATENT DOCUMENTS

FR    702278    *    1/1931    .................. 244/123

(Continued)

OTHER PUBLICATIONS

William D. Washington et al.; "Grid Fins—A new Concept for Missile Stability and Control"; American Institute of Aeronautics 1993, pp. 1-11.

(Continued)

*Primary Examiner*—Tien Dinh
(74) *Attorney, Agent, or Firm*—Weingarten, Schurgin, Gagnebin & Lebovici LLP

(57) ABSTRACT

A method for the manufacture of lattice fins for fluid-born bodies is provided. In one embodiment, lattice fins having a metallic cell structure are manufactured from strips or sheets of metal. In another embodiment, composite lattice fins are manufactured from a log assembly of elongated mandrels covered with a fiber reinforced composite material. After curing, individual fins are sliced from the log assembly. Upon removal of the mandrels, a cell structure is obtained. Combinations of the two embodiments are also provided.

21 Claims, 8 Drawing Sheets

FOREIGN PATENT DOCUMENTS

GB    502322    *   3/1939   .................. 244/123

OTHER PUBLICATIONS

Mark S. Miller et al.; "An Experimental Investigation of Grid Fin Drag Reduction Techniques"; American Institute of Aeronautics 1994, pp. 1-9.

Andrew Facciano; "High Temperature Organic Composite Application for Supersonic Missile Airframes", 2001.

David A. Fulghum; "Lattice Fin Design Key to Small Bombs"; Aviation Week & Space Technology, Sep. 25, 2000.

Mark S. Miller, "Application of Lattice Control Surface Technology to Miniaturized Munitions Technology (MMT) Airframes".

* cited by examiner

LATTICE FIN FOR MISSILES OR OTHER FLUID-BORN BODIES AND METHOD FOR PRODUCING SAME

CROSS REFERENCE TO RELATED APPLICATIONS

This application claims the benefit under 35 U.S.C. § 119(e) of U.S. Provisional Application No. 60/337,318, filed on Dec. 6, 2001, and 60/422,012, filed on Oct. 29, 2002, the disclosures of which are incorporated by reference herein.

STATEMENT REGARDING FEDERALLY SPONSORED RESEARCH OR DEVELOPMENT

The work leading to the invention received support from the United States federal government under SBIR Grant, Contract Nos. F08630-01-C-0029 and F08630-02-C-0014. The federal government may have certain rights in this invention.

BACKGROUND OF THE INVENTION

Many air-to-air and air-to-ground, powered and unpowered, guided and unguided munitions have a common feature—fixed, conventionally-shaped airfoil section fins to stabilize and direct the flight path after separation from an aircraft. These weapons, such as the MK80 family of "dumb" bombs and the AIM-9 air-to-air missile, are usually carried by tactical aircraft as external stores, where space for fixed fins is comparatively plentiful, and the range, speed, and radar cross section penalties associated with external carriage are tolerated.

External weapons carriage is a major source of drag and greatly increases radar reflection. Increasing emphasis on stealth technology increases the need for future air-launched weapons, sensors, and cargo of all types to be designed for internal carriage. Folding fin systems are one important approach to diminishing the stowed volume of these internally carried payloads. Internal payload carriage also demands more compact fin configurations. The same technology is similarly useful for any tube or gun launched, guided or unguided projectile or vehicle.

Traditionally, the US military has employed two basic types of folding fin systems. In a first type, airfoil-shaped fins are stowed so that they snap open in a direction parallel to the flight path. In a second type, side-deploying fins wrap around the circumference of the body of the weapon to minimize undeployed volume required for storage during transportation.

The Russian military has deployed several operational ballistic or air-to-air missile systems using an effective fin technology that is different in configuration and operation than any preceding deployable fin system. Termed a "gas dynamic declination device" by the Russians, and a lattice or grid fin in the US, this system consists of several essentially rectangular "paddles" filled with a grid of approximately triangular, square, and diamond-shaped cells formed by a cross-hatching of thin metal. The fins are fixed to the missile body at the root end in a manner that allows them to be folded flat against the body of the missile in storage. Upon launch, the fins are deployed with their broad lattice face perpendicular to the missile body axis, and may be attached to internal mechanisms that allow the fin to be moved for directional control of the payload. Deployment is reliable because air loads on the fin are usually in the direction of desired motion, up and to the rear, although springs or other devices may be used to assure or hasten deployment.

The US has undertaken an extensive evaluation of the lattice or grid fin concept. The first US patent on grid fin technology, U.S. Pat. No. 5,048,773, issued in 1991 and is held by the U.S. Government. There is a Russian patent claim for use of these devices in supersonic powered rockets such as the AA-12. Fulghum, David, "Lattice Fin Design, Key to Small Bombs," Aviation Week & Space Technology.

Numerous aerodynamic and systems studies, most notably by Mark Miller and David Washington, have been conducted over the past ten years. Miller, M. and Washington, D., "An Experimental Investigation of Grid Fin Design"; Miller, M. and Washington, D. "An Experimental Investigation of Grid Fin Drag Reduction Techniques"; and Miller, M. and Washington, D., "Grid Fins-A New Concept for Missile Stability and Control." These studies have shown that lattice fins are aerodynamically effective control surfaces that have slightly higher drag than conventional airfoil fins. If increasing priority is given to compact storage, lattice fins have an advantage over conventional systems. They offer interesting secondary advantages as well. They can operate at high angles of attack without flow separation because the multiple channels of the lattice act as guides controlling the flow. Because of their small size and small center-of-pressure travel with large changes of angle of attack, actuator size and power for controllers can be greatly reduced, leaving more space in an air-born system for fuel and other useful payload. Perhaps more importantly for internal carriage, lattice fins allow an air-born payload to maintain similar capability in a smaller package compared to a conventionally finned payload.

The fluid dynamics and performance of lattice fin-equipped bombs, rockets and missiles and other payloads have been extensively studied both analytically and experimentally for a decade. However, the structure of lattice fins has not significantly changed from the steel configuration mentioned in the US Government's 1991 patent on this technology. Operational Russian fins, as well as almost all US experimental lattice fins, have been built from metals to help them resist the high stagnation temperatures of supersonic flight.

Prior art steel lattice fins are expensive to make. These lattice fins are machined from a solid block of metal by electrical discharge machining (EDM) or water jet cutting. Air Force estimates of the cost of a stainless steel lattice fin made by EDM are approximately $2000. This price is beyond the level of reasonableness for many of the more "routine" and expendable classes of the payloads. Thus, a more cost-efficient lattice fin and method for its production are desirable for this technology to transition from a special purpose laboratory curiosity to a widely used performance enhancement.

SUMMARY OF THE INVENTION

The present invention provides a more cost efficient approach to the manufacture of lattice fins for fluid-born bodies. In one embodiment, metallic fins are manufactured using metal in sheet or strip form. In another embodiment, composite fins are manufactured from a log assembly of wrapped mandrels, individual fins being subsequently sliced from the log assembly after curing. Combinations of the two techniques are also useful.

In the metal lattice fin, strips of slotted metal are assembled in an egg crate fashion or bent to form a stair step to provide a cell structure. An outer frame is provided around the cell structure. The resulting assembly is fastened and solidified by, e.g., brazing, welding, or adhesive bonding. An attachment base or yoke is formed and attached to the cell structure.

In the composite fin, a fibrous reinforcement, either dry or pre-impregnated with a matrix material, is wrapped around elongated mandrels. The mandrels are assembled into a log, infused with the matrix material if necessary, and cured. The resulting log is transversely sliced to provide individual lattice fins. The slices need not be perpendicular to the longitudinal axis of the log, but can be contoured in any desired manner, for example, to fit against the curvature of the fluid-born body. Manufacturing the lattice structure in this manner allows recurring manufacturing costs to be spread over many finished parts.

DESCRIPTION OF THE DRAWINGS

The invention will be more fully understood by reference to the following detailed description when considered in conjunction with the accompanying drawings, in which.

DETAILED DESCRIPTION OF THE INVENTION

The present invention relates to a lattice or grid fin 10 having an interior cell structure 12 and a surrounding outer frame 14, illustrated generally in FIGS. 1-4. A base 16 is attached to or formed integrally with the frame at one end. The base is configured for pivoting attachment to a missile or other fluid-born body, and possibly also for later directed motion of the fin to control the path of the body. Those of skill in the art will appreciate that the particular design of the lattice fin, for example, the dimensions of the fin and the number, shape and configuration of cells in the cell structure, can vary depending on the intended application. The present methods of manufacturing a lattice fin are applicable regardless of the particular fin design.

According to the present invention, the lattice fin may be formed entirely of metal, entirely of a composite material, or may be a hybrid of metal and a composite material. A hybrid embodiment may have the interior cell structure 12 formed of metal with the outer frame 14 formed of a composite material, or the interior cell structure 12 formed of a composite material with the outer frame 14 of metal. In any embodiment, the base 16 may be formed of either metal or a composite material. Additionally, in any embodiment, a thicker shell of material can be added to the perimeter of the lattice grid or fin to increase strength and stiffness, as well as to protect the interior cell structure.

In a first embodiment, the lattice fin is made entirely of metal provided in sheet or strip form. That is, both the outer frame and the interior cell structure are made of metal. The choice of metal depends on factors such as the conditions of use and cost. For example, stainless steel or titanium may be used for high temperature applications, such as supersonic flight. Aluminum may be used for lower temperature applications, such as subsonic or transonic flight.

Figure 1:
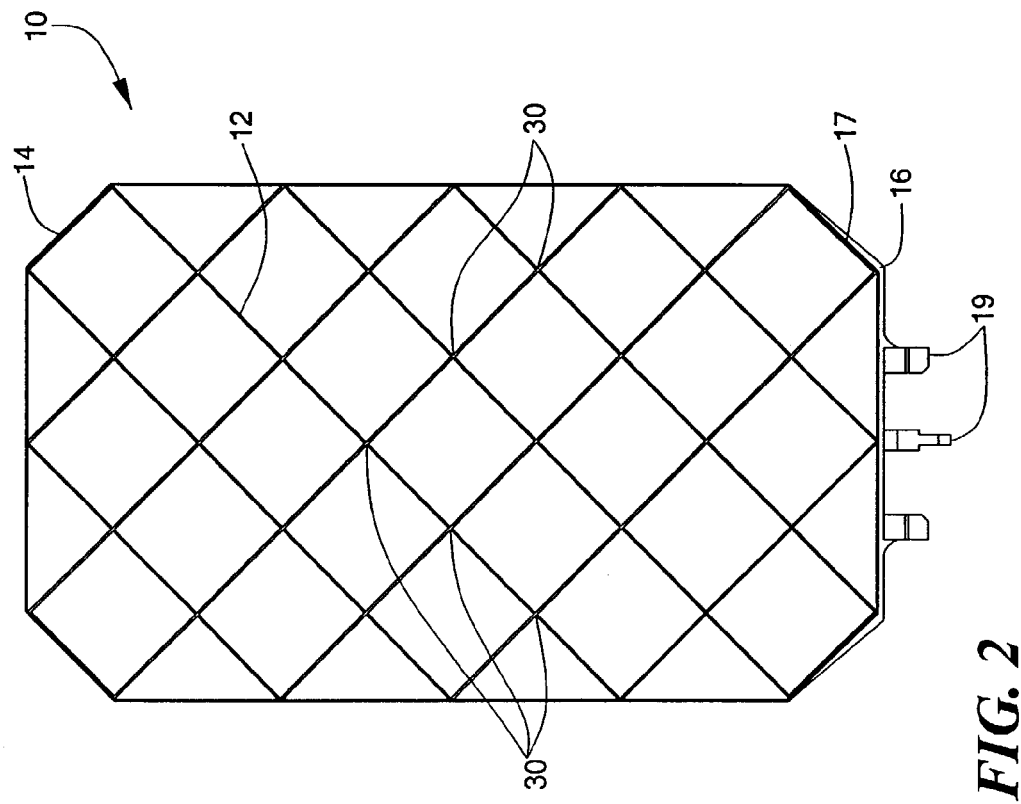
FIG. 1 is a perspective view of one embodiment of a lattice fin according to the present invention.
Figure 2:
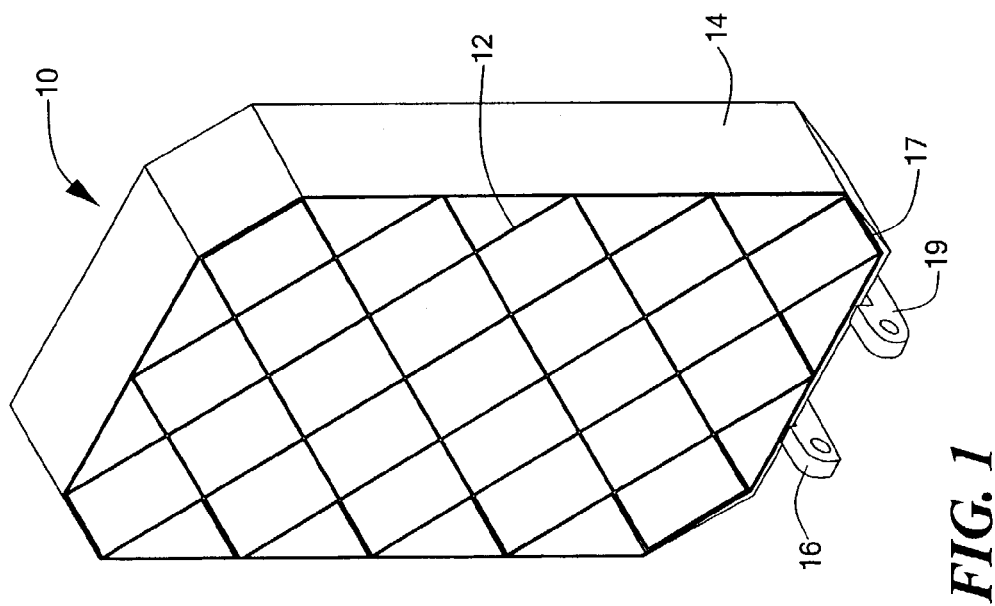
FIG. 2 is a front view of the lattice fin of FIG. 1.
Figure 3:
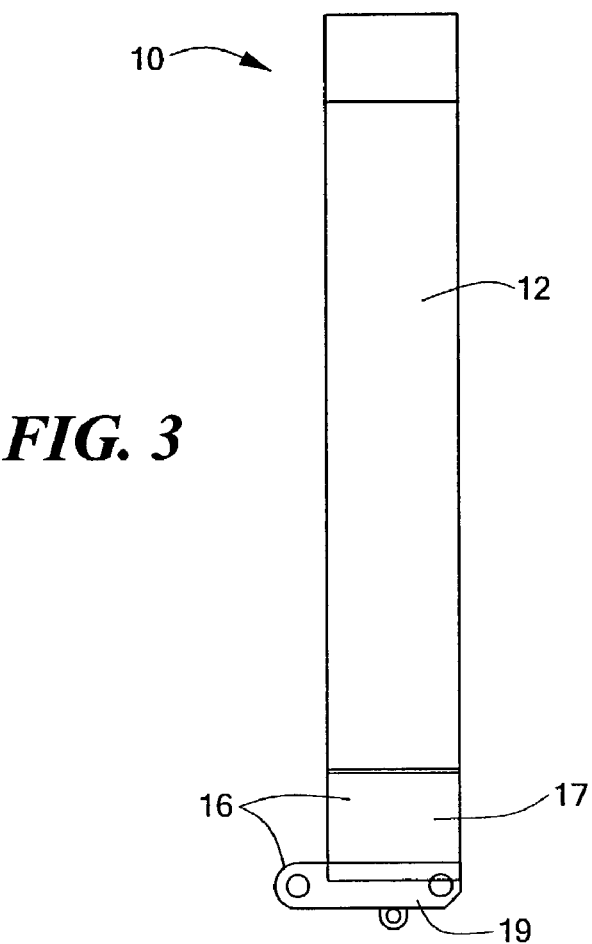
FIG. 3 is a side view of the lattice fin of FIG. 1.
Figure 4:
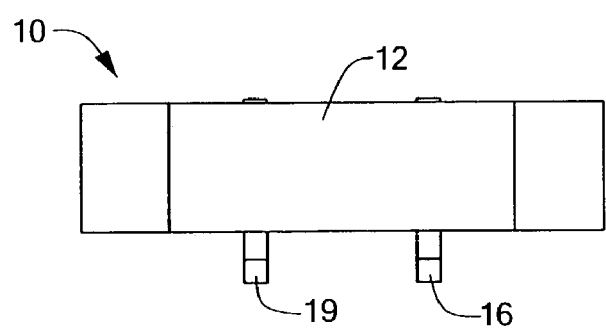
FIG. 4 is a top view of the lattice fin of FIG. 1.
Figure 6:
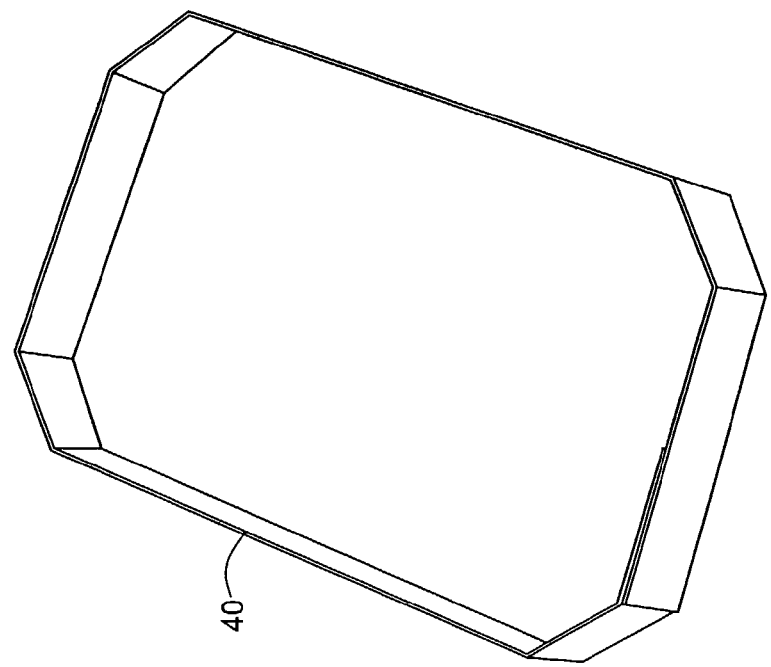
FIG. 6 is a perspective view of a metal outer frame formed from metal strips for a lattice fin embodiment under construction.
Figure 5:
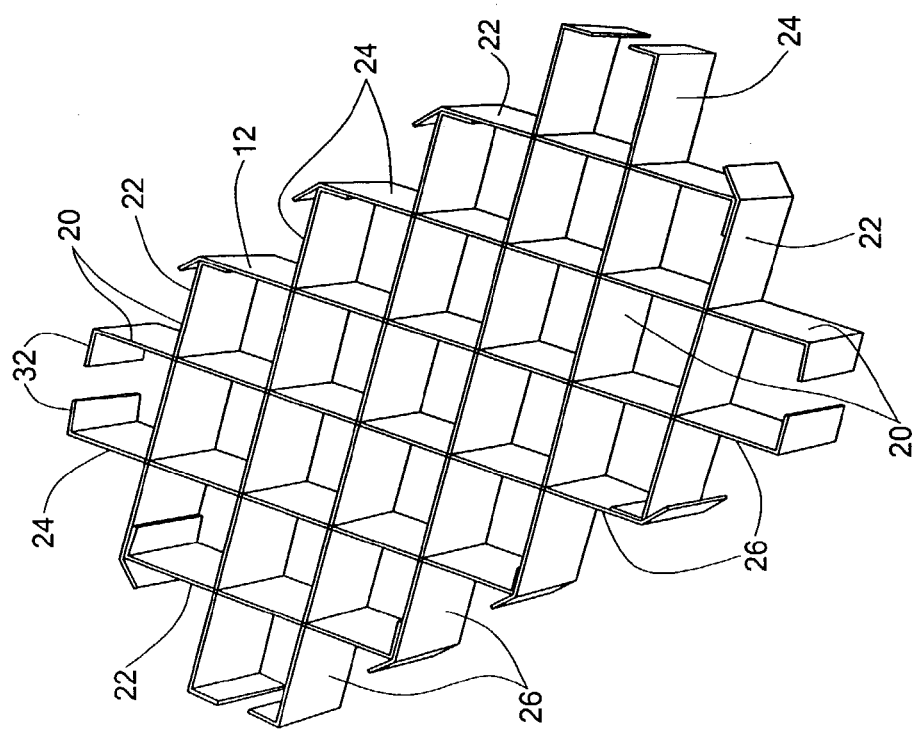
FIG. 5 is a perspective view of a metal interior cell structure formed from metal strips for a lattice fin embodiment under construction.
Figure 7:
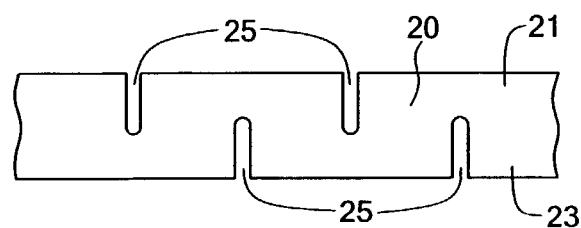
FIG. 7 is a partial plan view of one embodiment of a metal strip for the metal interior cell structure.
Figure 8:
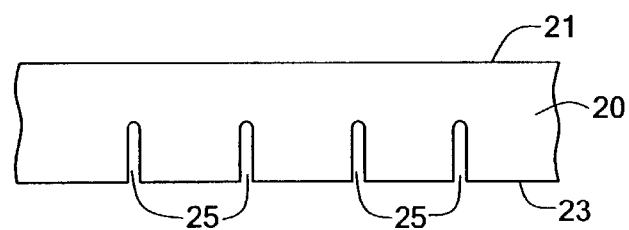
FIG. 8 is a partial plan view of a further embodiment of a metal strip for the metal interior cell structure.

In one embodiment, referring to FIGS. 5-8, the interior cell structure 12 is made from a plurality of elongated metal strips 20 having two opposed long edges 21, 23. The strips are slit at intervals for assembly in an egg crate fashion. The slits 25 can extend alternately from each long edge 21, 23 to the middle of the strip, as best seen in FIG. 7, or alternatively, can extend only from a single edge, e.g., edge 23, as best seen in FIG. 8. The distance between slits is chosen based on desired cell geometry, and may vary along the length of the strip to produce differing cell shapes in a grid if desired. The width of the slit is slightly more than the thickness of the strip with which it mates, to allow the two parts to slide into each other. When assembled, the slits 20 intersect to form joints 30 between the cell walls (see FIG. 2). The slits can be made in any suitable manner, such as by laser cutting, water jet cutting, sawing, machining, or any other manner apparent to those of skill in the art.

Any configuration of cells can be provided, depending on the application. The length of the strips and location of the slits depends on the particular cell configuration desired. In a suitable embodiment, the length of each strip is a multiple of the length of a cell wall plus a sufficient amount at one or both ends to form a bend 32 for attachment to the outer frame or to an adjacent strip. For example, in the configuration illustrated in FIG. 5, four strips 22 have a length sufficient to form three adjacent cell walls. Four strips 24 have a length sufficient to form five adjacent cell walls. Four strips 26 have a length sufficient to form six adjacent cell walls.

After assembly into the cell structure, the strips are fastened to each other in any suitable manner, as by brazing, welding, or bonding, so that the cell structure becomes an integral piece. A further metal strip 40 (see FIG. 6) is wrapped around the entire cell structure to form the outer frame. The outer frame is attached to the cell structure in any suitable manner, such as by brazing or welding. The cell structure and outer frame may be attached together in a single operation, for example, by furnace or dip brazing.

Alternatively, the outer frame may be attached to the cell structure after the cell structure has been fastened together. In a still further embodiment, the strips of the cell structure may be configured to form an outer frame integrally with the cell structure.

In another embodiment, the metal cell structure is overwrapped with a composite material that forms the outer frame 14. The composite material is formed from a unidirectional or multi-directional fibrous reinforcement impregnated with a matrix material. The fibrous reinforcement may be supplied initially in any suitable form, such as individual tows of continuous or spun fiber or yarn from spools, unidirectional tape, broadgoods formed of fibers that are woven, plied with perpendicular or other intersecting angles, nonwoven, or knitted, or in any other suitable form known in the art. The fibrous reinforcement, either dry or pre-impregnated with a matrix precursor material, can be wrapped around the metal cell structure, infused with a matrix precursor material if necessary, and cured in place, which also bonds the fabric to the metal. Alternatively, the composite frame can be molded independently and subsequently bonded to the metal cell structure. Any suitable structural adhesive that is capable of withstanding the intended operating temperatures can be used.

The lattice fin is frequently shaped to minimize drag. Toward this end, the strips 20 are made as thin as possible, while still providing sufficient strength to withstand the manufacturing process and the conditions of use. For example, stainless steel strips can be made as thin as 0.005 inch. A greater thickness may be acceptable, depending on the application.

Figure 9:
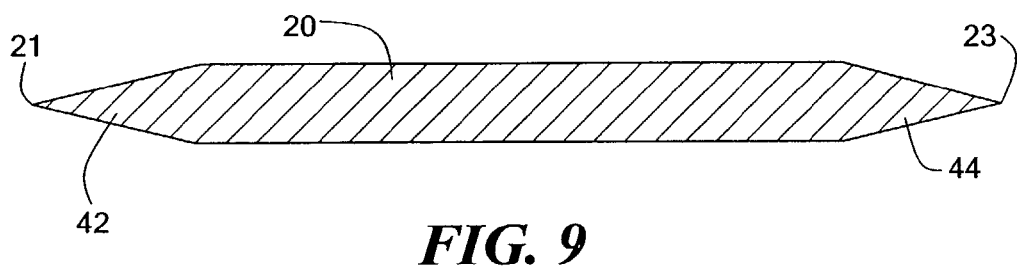
FIG. 9 is a cross-sectional view of a single metal strip for the metal interior cell structure illustrating shaping of the leading and trailing edges.

As a further way to reduce drag when such is desirable for a particular application, the strips 20 can be shaped on one or both edges 21, 23 to a double bevel or other aerodynamically appropriate shape 42, 44 to provide an aerodynamic profile for reducing drag. See FIG. 9. Preferably, at least the edge forming the leading edge of the lattice fin when in use is shaped. The lowest drag results when both the leading and trailing edges are shaped. Preferably, the strips are shaped prior to slitting and assembly into the cell structure. The strips can be shaped in any suitable manner, such as by the sharpening process used for razor blades.

Figure 10:
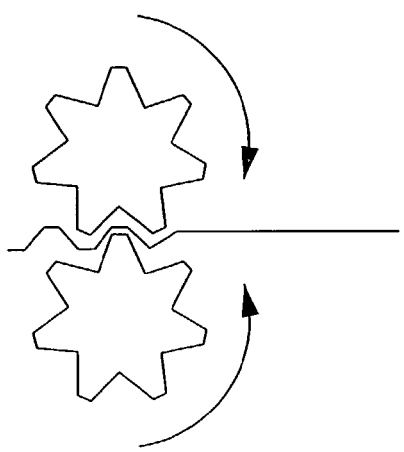
FIG. 10 is a schematic view of a step of bending metal strips to form an interior cell structure according to a further embodiment of the invention.
Figure 11:
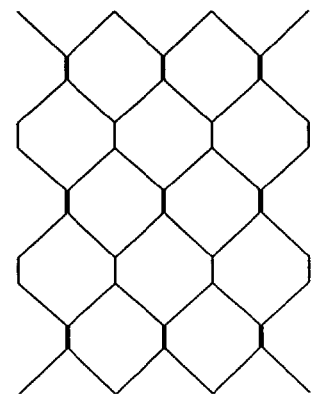
FIG. 11 is a schematic view of a step of expanding strips of metal to form an interior cell structure according to a still further embodiment of the invention.

In another embodiment, the cell structure is fabricated as a lattice by bending metal strips of the appropriate width to provide the desired configuration. See FIG. 10. The bent strips are assembled and welded or otherwise fastened together at their points of contact. In a further embodiment, a lattice structure is created by welding strips of metal together at alternate locations and expanding the strips. See FIG. 11. This produces a lattice with thicker walls at the points of attachment. An outer frame of metal or composite material is wrapped around the perimeter of the cell structure, as described above.

In still another embodiment, the cell structure 12 is formed from sheet metal stock formed over mandrels into tubing, which can be square, round, or another appropriate cross-sectional shape. The tubes are then stacked and brazed or welded together at their contact points to form a long lattice log structure. The log is then sliced into fins of the appropriate width. The tubes can have different geometries or wall lengths, to provide any desired configuration for the finished grid, once assembled. An outer frame of metal or composite material is provided around the perimeter of the cell structure, as described above.

In a further embodiment, the interior cell structure 12 is formed from a composite material comprising a unidirectional or multi-directional fibrous reinforcement impregnated with a matrix material. Suitable fibers include carbon, boron, Aramid, ceramic, and glass fibers, nano-fibers, and other structural reinforcement fibers known in the art. The fibrous reinforcement may be supplied initially in any suitable form, such as individual tows of continuous or spun fiber or yarn from spools, unidirectional tape, broadgoods formed of fibers that are woven, plied with perpendicular or other intersecting angles, nonwoven, or knitted, or in any other suitable form known in the art. Suitable matrix materials include resins such as epoxy, polyester, vinyl ester, phenolic, bismaleimide, cyanate ester, and thermoplastic resins, as well as carbon and various metals, and other suitable matrix materials known in the art. Those of skill in the art will appreciate that the types of fiber materials and matrix materials are extensive and will further appreciate that any suitable fiber material and matrix material can be used, as appropriate for the intended application.

Figure 12:
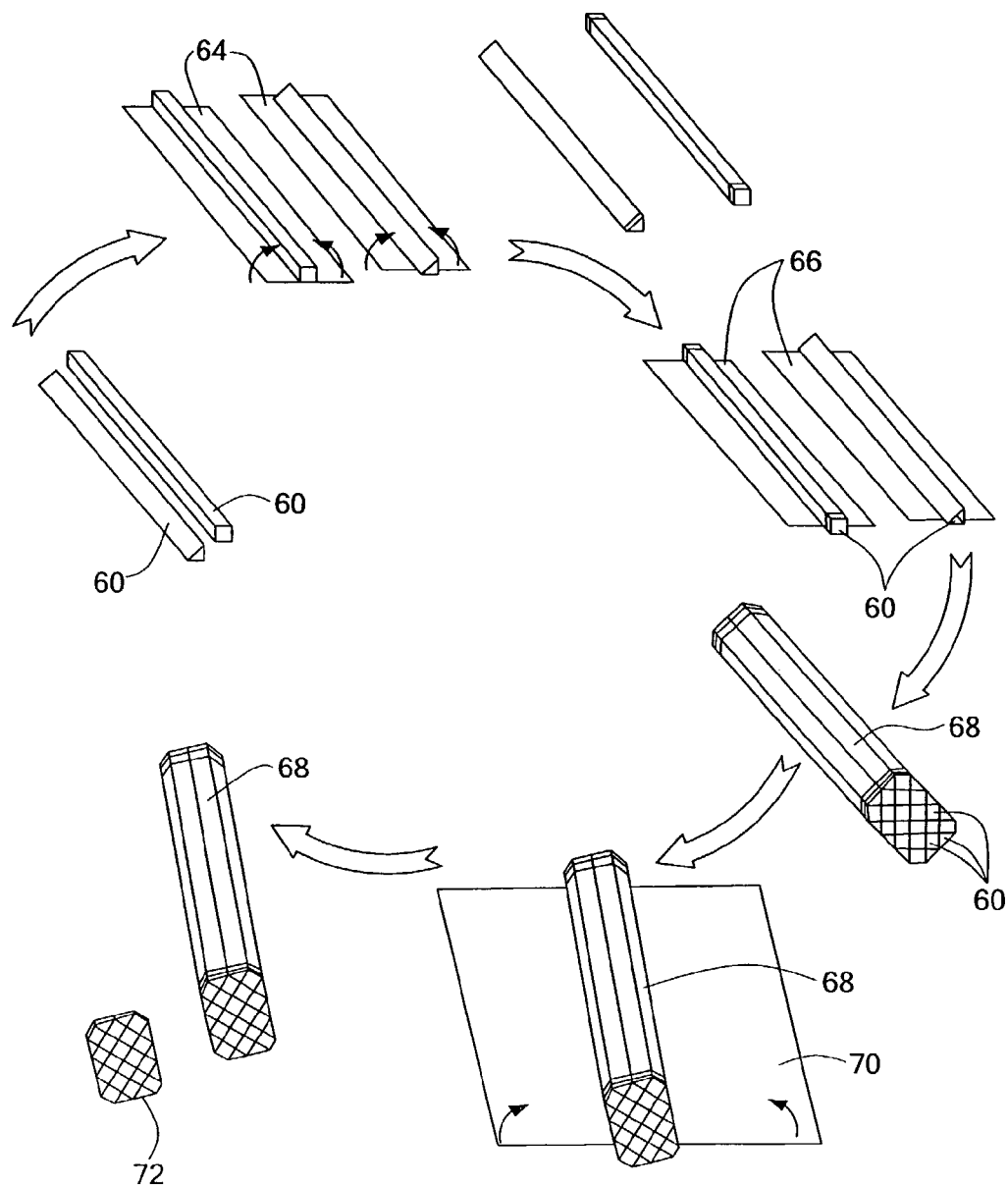
FIG. 12 is a schematic diagram illustrating steps in the process of forming a lattice fin from a composite material according to a further embodiment.

The composite material cell structure is formed by constructing a long lattice log, then slicing the log into sections of the appropriate thickness, such as 1 inch, and shape, such as planar or contoured. Each slice becomes a separate lattice fin. The process for forming a lattice log is illustrated in FIG. 12. In the first step, a desired number of mandrels 60 is provided in the desired cross-sectional shapes to form the various cells of the cell structure. Square and triangular mandrels are illustrated, but other shapes, such as rectangular, hexagonal, octagonal, or circular, or other segmented curved shapes can be provided, as desired for the particular lattice fin configuration. The mandrels can be machined or extruded in an appropriate length. Square extrusions can be machined to form triangular halves. Aluminum is a suitable material for extrusion processes. A machining process is more suitable for steel or titanium. Extruded and/or machined plastic mandrels from materials such as polytetrafluoroethylene (PTFE) and mandrels cast from ceramics, salts and other initially fluid materials can also be provided. Mandrel materials can be chosen to be dissolvable to remove them from the log after molding and curing. Soluble materials include water soluble ceramics or salts. Aluminum can be dissolved with an aluminum solvent. Mandrels can also be made from silicone and other materials that expand considerably during heating to provide compaction force during the curing process. The mandrels then shrink upon cooling, allowing the mandrels to be mechanically removed more easily.

Optionally, each mandrel is coated with a release agent to aid in subsequent mechanical removal of the mandrels from the part after curing. For example, the mandrels can be wrapped with a release tape 64, such as a PTFE tape, or sprayed or dipped in a release agent such as a wax or wax-like material. The mandrels are then covered with the composite material. In one embodiment, the mandrel may be wrapped by laying a fiber/resin prepreg fabric and/or broadgoods 66 of any suitable or arbitrary fiber arrangement over the mandrel in any desired number of layers. In other embodiments, the material can be braided onto the mandrel or filament wound onto the mandrel. The material can be a prepreg fabric, in which a resin for the matrix material has been combined with the fibrous reinforcement and partially cured to a "b-stage" prior to application to the mandrel, and is subsequently cured. Pre-impregnated composite starter materials aid the mandrel wrapping process because the matrix material, when slightly heated, becomes tacky and helps the fabric stick to the mandrels. Alternatively, the material can be dry and the matrix material infused subsequently into the fibers.

The individual mandrels are assembled into a log assembly 68 having the desired cell configuration. The log assembly of mandrels can be overwrapped with an outer layer 70 of a composite material at this stage for formation of the outer frame. Alternatively, the mandrels can be wrapped so that the outer cell walls define the frame. The assembly, with or without the overwrapping, is placed in suitable tooling assembly 80 (see FIG. 13) to apply pressure and maintain the mandrels in alignment while the matrix material cures. The assembly is then cured in a suitable curing press or oven for a suitable duration or the tooling may include internal heaters, as would be known in the art. If a dry fiber method such as braiding or filament winding is used to apply the fibrous reinforcement to mandrels or to form the outer frame, the matrix material is infused into the log assembly prior to cure.

After curing, the log assembly 68 is removed from the tooling assembly 80. A composite material to form the outer frame 14 can be placed around the cured log assembly at this stage, if the outer frame was not formed previously. If necessary, any further curing may take place. The mandrels 60 are then pushed out or otherwise removed from the log assembly. Individual lattice fins 72 are sliced from the log in any desired width. Alternatively, the mandrels can be left in place during slicing and other finishing operations to help stabilize the thin cell walls and removed later in the process after individual fin-slicing has occurred. As noted above, the outer frame 14 can alternatively be a metal frame. The metal frame can be attached to the composite cell structure in any suitable manner, such as by curing of the matrix material or with a suitable bonding adhesive.

In one suitable embodiment, the composite cell structure is formed from a plain weave fabric of carbon fibers pre-impregnated with epoxy resin. The fabric should be as thin as possible if minimizing the thickness of the cell walls is desired. For example, using a 1K tow fabric, each mandrel can be wrapped with a single layer, resulting in a double-ply cell wall thickness as little as 0.008 to 0.016 inch. A suitable 1K tow fabric is commercially available from Aerospace Composite Products of California. Other commercially available carbon/epoxy prepregs woven with a 3K tow result in a material that makes laminates with a cured ply thickness of approximately 0.010 inch. Wrapping all mandrels with such a fabric results in a cell structure having a wall thickness of approximately 0.020 inch. If the cell walls are desired to be formed with a single ply, alternate mandrels can be wrapped. Similarly, if walls of greater thickness are desired, multiple plies or a heavier fabric can be used. It is also possible to tailor cell wall thickness by wrapping mandrels with different materials, so that the finished wall thickness becomes the total of the materials on facing mandrel surfaces in the final assembly.

Figure 13:
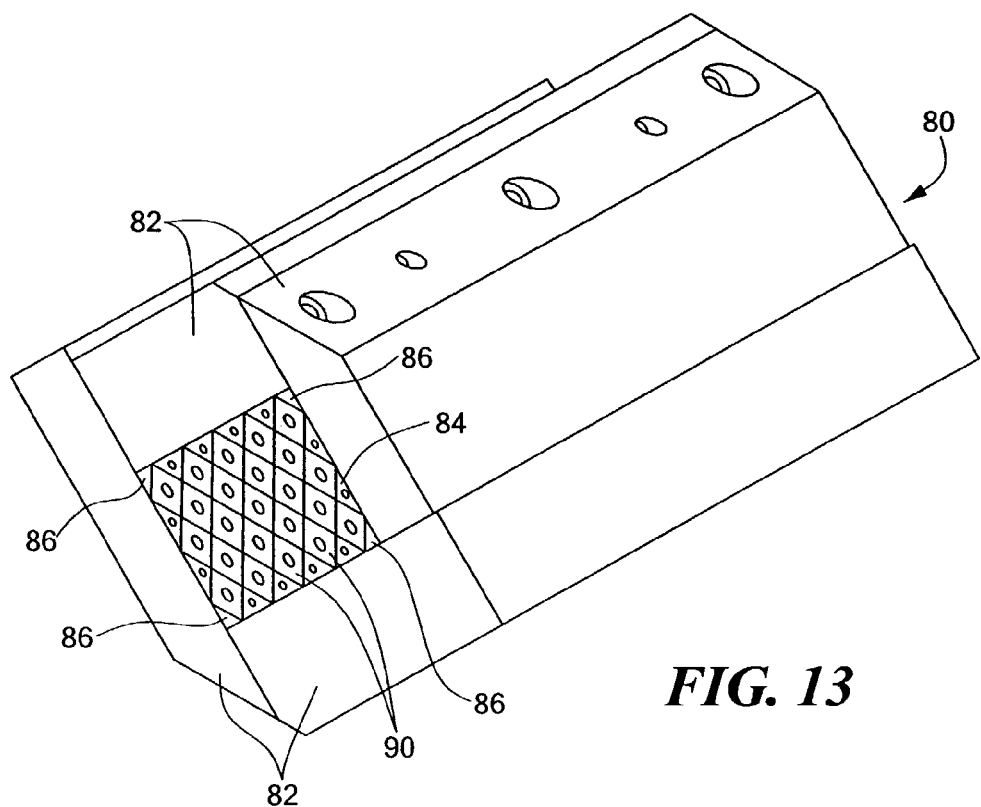
FIG. 13 is a schematic isometric diagram illustrating a tooling assembly for use in the process of FIG. 12.

FIG. 13 illustrates one suitable form of the tooling assembly 80 for the composite lattice fin. The tooling assembly includes a mold assembly having pieces 82 arranged to form a cavity 84 of the desired final outer configuration. In the embodiment illustrated, a rectangular cavity is provided. For a lattice fin with beveled corners, outer triangular shims 86 can be provided to fill the corners of the mold cavity if the mold cavity is not formed with beveled corners. Alignment buttons 90, described below, maintain the mandrels in proper alignment in the cavity.

Figure 14:
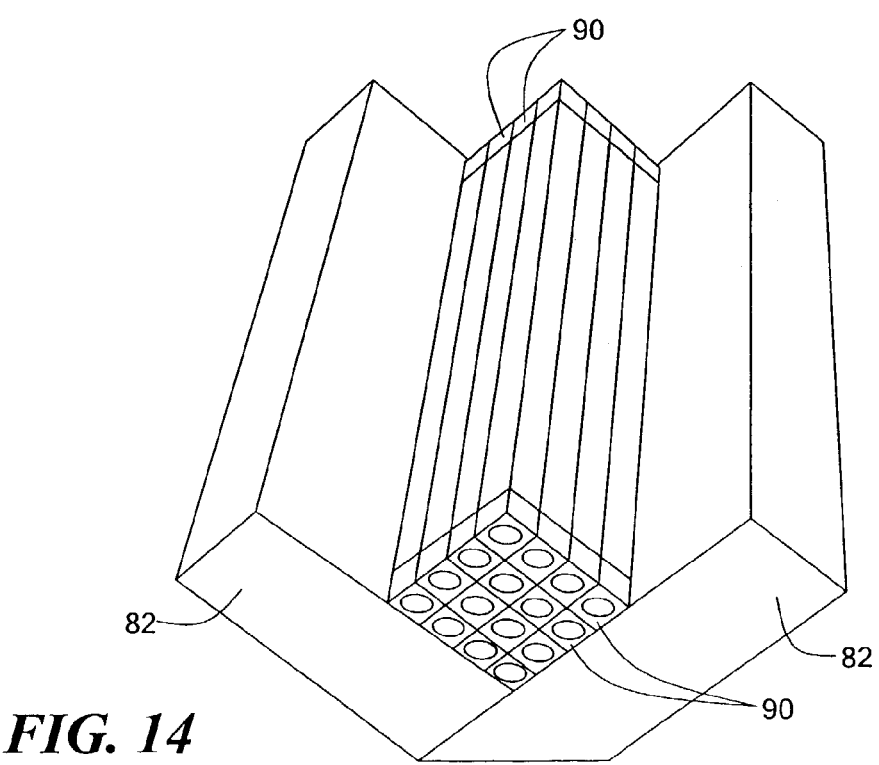
FIG. 14 is a perspective view illustrating mandrel alignment buttons for use with the tooling of FIG. 13.
Figure 15:
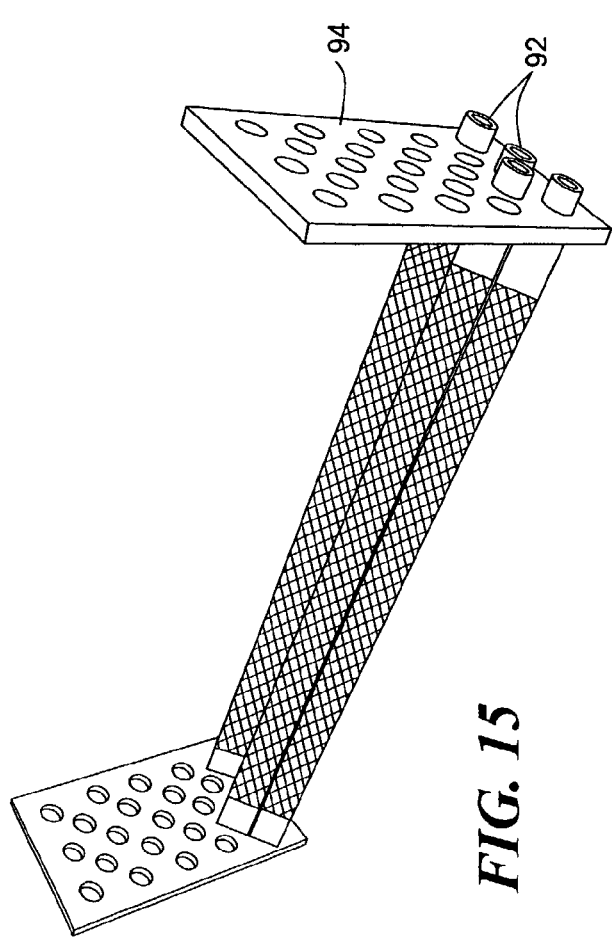
FIG. 15 is a perspective view illustrating mandrel alignment end plates for use with the tooling of FIG. 13.

To aid in holding the mandrels in alignment in the tooling assembly and/or to minimize twisting of the mandrels, an alignment fixture assembly can be provided at each end of the log assembly. In one embodiment, an alignment button 90 is provided on each end of each mandrel. See FIG. 14. The buttons are preferably made from any suitable material, such as brass, and each button has the same cross-section as its corresponding mandrel. The dimensions of the buttons are precisely oversized from their associated mandrels by the thickness of the material to be wrapped over the mandrel. After the mandrels are wrapped with the uncured or partially cured composite, each end is plugged with a button, which can be friction fit or fastened to a counterbore in the mandrel end in any suitable manner. When the mandrels are loaded into the tooling assembly, the uncured or partially cured composite material is compressed until the surfaces of the buttons come into contact with one another and the mold cavity surfaces and force the mandrels into a precise alignment within the tool. This greatly improves alignment of the cell wall intersections, because each mandrel has a hard stop. In addition, the mandrels are restrained from rotation. Other approaches to mandrel centering are possible, including insertion of aligning pins 92 into the end of each mandrel through an end plate or jig 94 with appropriately spaced holes. See FIG. 15. In cases where precise interior geometry is less important, the same general approach can be used with no special provision to maintain mandrel center-to-center location or to restrain rotation.

Figure 16:
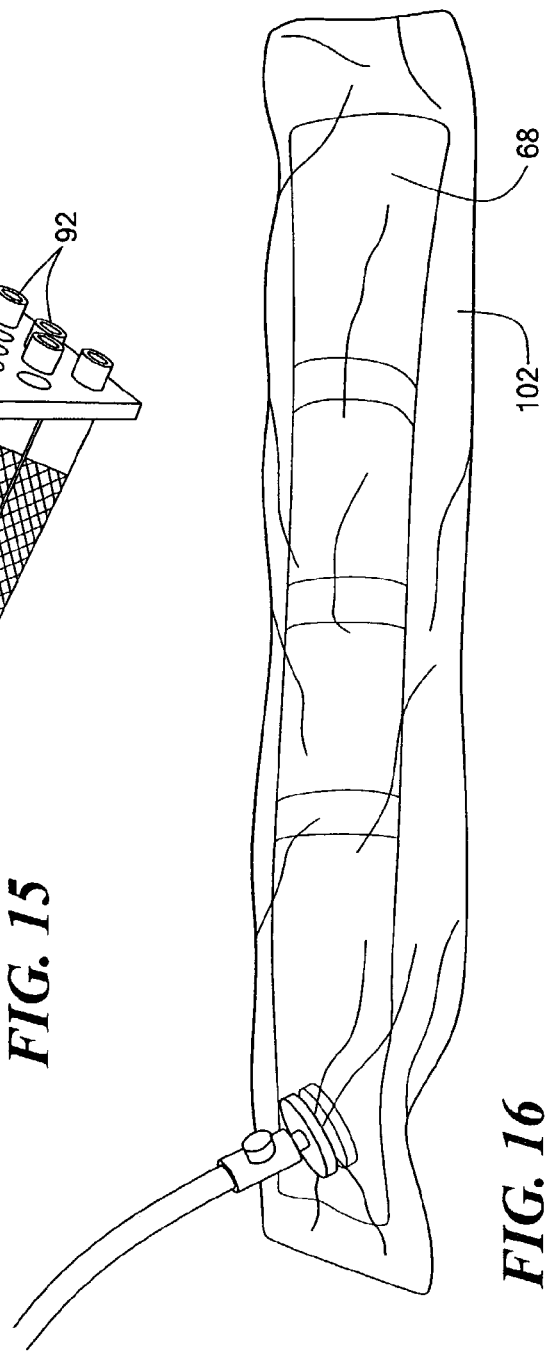
FIG. 16 is a perspective view of a vacuum bagging process for forming a lattice log structure according to a further embodiment of the present invention.

In an alternative embodiment, a vacuum bagging process can be used to cure the log assembly, eliminating the requirement to fabricate a hard outer tool. See FIG. 16. In this process, the log assembly 68 is placed within a bag 102 and a vacuum applied to draw resin through the fabric. Alternatively, a prepreg material can be used and the resin infusion step avoided. The vacuum bag can be placed in an autoclave and the exterior pressure can be raised to aid in compacting the material and prevent fiber buckling. Alternatively, the same procedure can be used with a furnace operating at atmospheric pressure, without applying additional external compaction pressure beyond that created by drawing a vacuum in the bag.

The mandrels and composite material can be laid up in a variety of other ways. For example, a layer of wrapped or unwrapped mandrels can be laid in a mold cavity, for example, angled to provide a row of diamond shapes, and a composite material laid over the surface of the row of mandrels. A second row of mandrels, wrapped or unwrapped, can be laid over the composite material to compress the material into the angles between the mandrels of the first row. By varying the compression of the material into angles and the number of layers of material, differential wall thicknesses can be obtained. For example, it may be desirable to provide greater wall thicknesses near the base of the lattice fin where the greatest stresses are encountered in use.

A further embodiment uses a unidirectional tape. The tape is advantageous in that the cured ply thickness may be approximately 0.005 inch per layer. This may be advantageous over broadgoods, because the orientations can be tailored to a desired direction of interest for optimal strength and/or stiffness. The tape is typically slightly thinner than broadgoods, thus making it possible to use multiple layers per cell wall, rather than fewer layers per wall for broadgoods in certain applications and still obtain a low finished wall thickness. Using multiple layers allows an optimal amount of material to be oriented in the desired direction.

Figure 17:
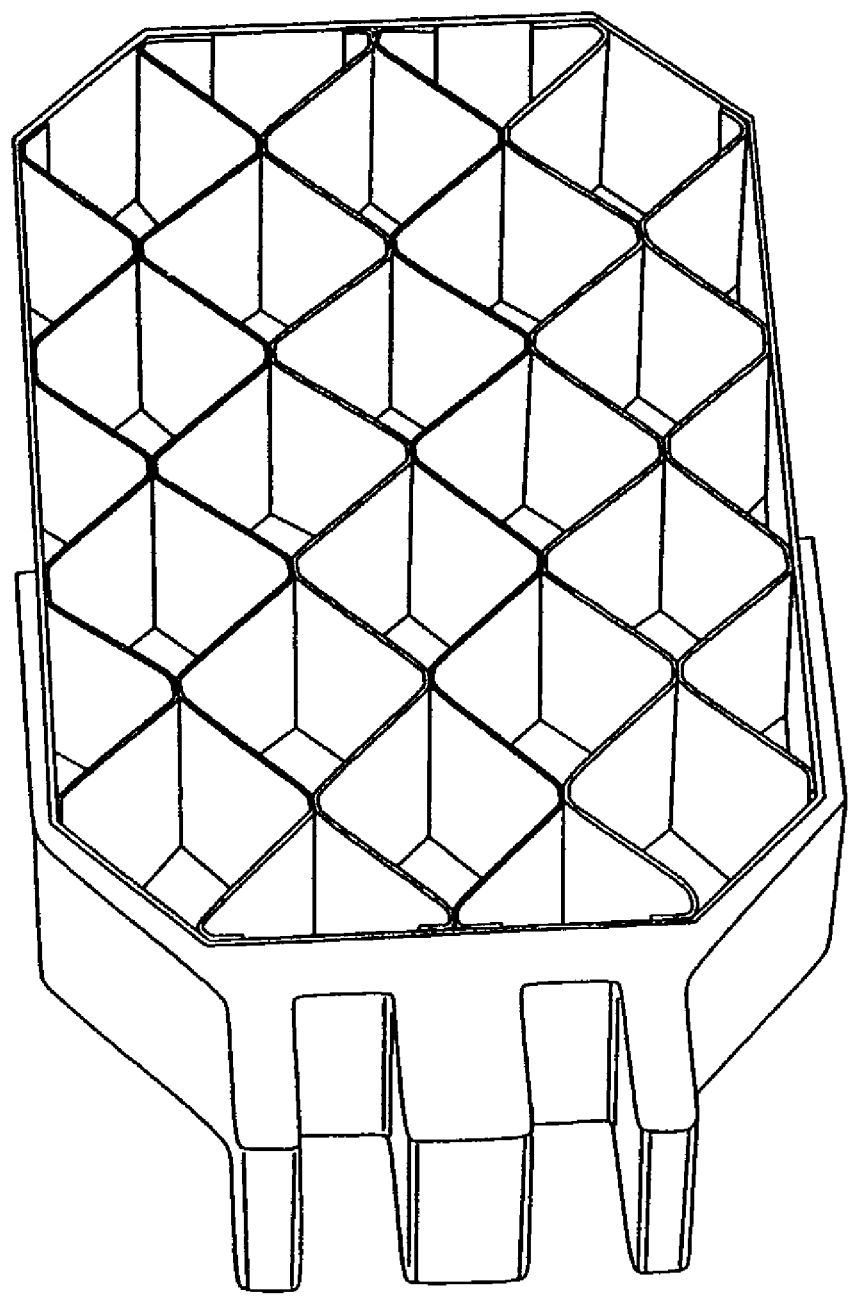
FIG. 17 is a perspective view of a metal lattice fin according to the present invention.

As noted above, the lattice fin also includes a base that enables the lattice fin to be mounted for pivoting motion to a body. The base includes a portion 17 for attaching to the frame and mounting fixtures 19 for mounting to the body. It will be appreciated that the particular configuration of the base depends on the application and the desired mounting arrangement to the fluid-born body. (See, for example, FIG. 17.) The base can be formed of metal or of a composite material. The base can be formed in any suitable manner, such as by molding, pultrusion, hand-layup, extrusion, machining, or casting. If formed as a pultrusion, extrusion, or other initially long continuous strip, individual bases can be sliced from a single long part. The base structure may also be fabricated by machining using conventional machining techniques or through other processes such as laser cutting, water jet cutting, or electrical discharge machining. The base can also be formed of a composite material integrally with the lattice fin. In this case, appropriate tooling is provided and the composite material is laid up to form the desired base configuration, as would be known in the art.

When the base is formed separately from the cell structure and frame, the base can be attached to the fin in any suitable manner, such as by furnace brazing, dip brazing, welding, or adhesive bonding. The base can also be formed integrally with the outer frame. For example, the base and outer frame can be cast as a single piece of metal.

The lattice fin typically requires a certain amount of finish machining, such as drilling and tapping of holes. In some cases, inserts may be used to reinforce the hole areas or provide other useful features, such as spring deployment. The composite cell structure can be machined to provide an aerodynamic shape to the leading and trailing edges, or the fin can be used with the as-sliced, square or contour cut ends. The lattice fin is then attached to the desired missile or other fluid-born body.

The intended application influences the particular choice of lattice fin embodiment and configuration. For example, when bomb bay doors open, there can be a high level of acoustic noise, subjecting the fins to a severe dynamic loading condition. The lattice fin walls must be sufficiently robust to withstand this loading. The lattice fins may be required to withstand operation at supersonic, subsonic, or transonic speeds. In some applications, minimizing drag is important, whereas in other applications, minimizing drag is of less concern. Similarly, in some applications, the ability to operate at high temperatures is important, whereas in other applications, the temperature is of less concern.

Prior art lattice fins have been developed for use with missiles, bombs, or rockets. The lattice fin of the present invention is suitable for these applications and can also be used with other fluid-born bodies. For example, the fins can be used on cargo canisters filled with emergency relief supplies that are dropped from aircraft. It can also be useful for air-dropped sensor systems, and various ground-based, range-extended, rocket and gun-launched projectiles and missiles. Underwater applications that take advantage of the compact storage and lower control moments are also possible.

The invention is not to be limited by what has been particularly shown and described, except as indicated by the appended claims.

What is claimed is:

1. A lattice fin having an open cellular configuration providing aerodynamic surfaces for use on a fluid-born body, comprising:
    an interior cell structure comprising an array of cells defined by cell walls having a depth direction and open ends, the cell walls comprising aerodynamic surfaces, having a leading edge and a trailing edge, for fluid flowing through the open ends and past the cell walls;
    an outer frame surrounding the interior cell structure about outermost walls of the cell walls;
    wherein the interior cell structure is formed of a composite material comprising a fibrous reinforcement impregnated with a matrix material; and
    a base attached to the outer frame and configured for attachment to the fluid-born body.

2. The lattice fin of claim 1, wherein the cells are formed of a single ply of the composite material.

3. The lattice fin of claim 1, wherein at least a portion of the cells are formed of multiple plies of the composite material.

4. The lattice fin of claim 1, wherein the cell walls have differing wall thicknesses.

5. The lattice fin of claim 1, wherein the outer frame is formed of a composite material comprising a fibrous reinforcement impregnated with a matrix material.

6. The lattice fin of claim 1, wherein the outer frame and the cell structure are formed of a same composite material.

7. The lattice fin of claim 1, wherein the outer frame is formed of metal.

8. The lattice fin of claim 7, wherein the outer frame is formed of stainless steel.

9. The lattice in of claim 1, wherein the base comprises an extrusion.

10. The lattice fin of claim 1, wherein the base is formed of metal.

11. The lattice fin of claim 10, wherein the base is formed of aluminum.

12. The lattice fin of claim 1, wherein the base is formed of a composite material.

13. A lattice fin having an open cellular configuration providing aerodynamic surfaces for use on a fluid-born body, comprising:
    an interior cellular structure comprising an array of cells defined by cell walls comprising strips of metal, the cell walls having a depth direction and open ends, the cell walls comprising aerodynamic surfaces, having a leading edge and a trailing edge formed by edges of the strips of metal, for fluid flowing through the open ends and past the cell walls, at least one of the leading edge and the trailing edge of the strips of metal shaped to comprise an aerodynamic profile;
    an outer frame surrounding the cellular structure about outermost walls of the cell walls; and
    a base attached to the outer frame, the base configured for attachment to the fluid-born body.

14. The lattice fin of claim 13, wherein the cell walls have differing thicknesses.

15. The lattice fin of claim 13, wherein the outer frame is formed of a composite material comprising a fibrous reinforcement impregnated with a matrix material.

16. The lattice fin of claim 13, wherein the outer frame is formed of a metal.

17. The lattice fin of claim 16, wherein the outer frame is formed of stainless steel.

18. The lattice fin of claim 13, wherein the base comprises an extrusion.

19. The lattice fin of claim 13, wherein the base is formed of metal.

20. The lattice fin of claim 19, wherein the base is formed of aluminum.

21. The lattice fin of claim 13, wherein the base is formed of a composite material.

* * * * *

UNITED STATES PATENT AND TRADEMARK OFFICE
CERTIFICATE OF CORRECTION

PATENT NO. : 7,243,879 B2 Page 1 of 1
APPLICATION NO. : 10/313222
DATED : July 17, 2007
INVENTOR(S) : Jerome P. Fanucci et al.

It is certified that error appears in the above-identified patent and that said Letters Patent is hereby corrected as shown below:

Column 10, claim 9, line 22, "in" should read --fin--.

Signed and Sealed this

Twentieth Day of May, 2008

JON W. DUDAS
*Director of the United States Patent and Trademark Office*